United States Patent [19]
Ellis

[11] Patent Number: 6,036,989
[45] Date of Patent: Mar. 14, 2000

[54] VEGETABLE CORE REMOVAL APPARATUS

[76] Inventor: Anthony George Ellis, 20A Winchester Avenue, Grimsby S. Humberside DN33 1EH, United Kingdom

[21] Appl. No.: 09/051,369

[22] PCT Filed: Oct. 7, 1996

[86] PCT No.: PCT/GB96/02453

§ 371 Date: May 22, 1998

§ 102(e) Date: May 22, 1998

[87] PCT Pub. No.: WO97/13418

PCT Pub. Date: Apr. 17, 1997

[30] Foreign Application Priority Data

Oct. 7, 1995 [GB] United Kingdom .................. 9520535
Apr. 19, 1996 [GB] United Kingdom .................. 9608117

[51] Int. Cl.[7] .............................. A23N 3/00; A23N 3/12; A23N 15/00; A23N 15/02
[52] U.S. Cl. .............................. 426/484; 99/542; 99/544; 99/635; 99/638; 99/642; 99/643; 426/481; 426/518
[58] Field of Search ............................... 99/537, 538–545, 99/546, 584, 635, 637–643; 426/478, 481, 482, 484, 518

[56] References Cited

U.S. PATENT DOCUMENTS

| 3,754,470 | 8/1973 | Console ..................................... 99/538 |
|---|---|---|
| 4,099,456 | 7/1978 | Cornish ..................................... 99/638 |
| 4,453,458 | 6/1984 | Altman . | 
| 4,658,714 | 4/1987 | McIlvain et al. .......................... 99/637 |
| 4,773,324 | 9/1988 | Wylie et al. ............................... 99/638 |
| 5,009,909 | 4/1991 | Hirtle et al. . |
| 5,168,801 | 12/1992 | Switek, Jr. ................................ 99/546 |
| 5,415,083 | 5/1995 | Nagaoka ............................... 99/584 X |
| 5,470,602 | 11/1995 | Cecil ...................................... 426/481 |

FOREIGN PATENT DOCUMENTS

| 0 552 902 A1 | 7/1993 | European Pat. Off. . |
|---|---|---|
| 94/26134 | 11/1994 | WIPO . |
| 96/13180 | 5/1996 | WIPO . |

*Primary Examiner*—Timothy F. Simone

[57] ABSTRACT

Apparatus for the automated removal of cores from vegetables, especially floretting vegetables, comprises a conveyor (13, 14) including vegetable supports (15) for indexed advancing of vegetables (35) from a loading station (A) to a cutting station (B) and a cutting head assembly comprising one or more cutter elements (23) movable in a core-excision cutting movement, in which the cutting head assembly is movable between a cutting position in registration with a vegetable support in the cutting station and a core discharge position displaced from the pass of the conveyor. The apparatus may be single- or multi-lane. The cutter blades may be formed as lobes (23) which retain the excised cores in the closed-together condition pending ejection at the discharge position.

12 Claims, 4 Drawing Sheets

6,036,989

VEGETABLE CORE REMOVAL APPARATUS

CROSS-REFERENCES TO RELATED APPLICATIONS

This application is a U.S. national application of international application serial No. PCT/GB96/02453 filed Oct. 7, 1996, which claims priority to British Serial Nos. 9520535.7 and 9608117.9 filed Oct. 7, 1995 and Apr. 19, 1996, respectively.

This invention relates to apparatus for removal of the cores from vegetables, especially floretting vegetables such as cauliflower and broccoli (calabrese), thereby separating the edible portions from the cores.

In the frozen food industry, there is a need for automated apparatus which will reliably and speedily prepare large volumes of vegetables for freezing, by separating the edible portions from the cores, while the vegetables are still in prime condition following harvesting. Various prior proposals have been put forward especially for large machines with multiple cutting heads but there is still a commercial requirement for a relatively low-cost machine having a more modest throughput. It is an object of the present invention to provide such a machine.

According to the invention, apparatus for the automated removal of cores from vegetables comprises conveyor means including vegetable supports for indexed advancing of vegetables from a loading station to a cutting station and a cutting head assembly comprising one or more cutter elements movable in a core-excision cutting movement, in which the cutting head assembly is movable between a cutting position in registration with a vegetable support in the cutting station and a core discharge position displaced from the pass of the conveyor means.

According to another aspect of the invention, a method of removing the cores from vegetables comprises placing vegetables in the inverted state on supports carried by a conveyor means, advancing said conveyor means in indexed manner to bring successive vegetables to a cutting station, and excising the cores from said vegetables, in which the cores are excised by one or more cutter elements forming part of a cutting head assembly movable between a cutting position in registration with a vegetable support in the cutting station and a core discharge position displaced from the pass of the conveyor means.

It is to be understood that the cutting head assembly is displaced from the pass of the conveyor means when the assembly is either to one side of or above the conveyor means.

In the use of the invention and after excision of the cores, the remaining edible portions may be removed from the conveyor for freezing.

The invention is particularly appropriate for generally ball-shaped vegetables which can be placed individually, inverted or core-uppermost, on the supports, especially floretting vegetables where the edible portions form discrete florets on separation from the core. The cutter elements may comprise cutter blades which are pivotably mounted for cutting movement in which the cutting edges follow an arcuate path, whereby they cut into the vegetable rather than across, thereby enabling more complete removal of the core without accompanying wastage of significant amounts of the edible portions. The cutter blades may comprise semi-cylindrical parts which are pivotably connected together and are formed with dependent oblique cutting edges which open and close in the manner of a beak, but the blades preferably merely comprise a pair of pivotably-mounted cutter lobes having oblique cutting edges which are movable, again in beak-like manner, between a core-embracing condition when open and a core-excision condition when closed together, optionally with some overlap to provide a shearing cutting action.

Alternatively, the cutter elements may comprise C-shaped cutter blades pivotably connected together for movement between an open position and a closed-together excision position, in which at least one cutter blade has a cutting edge disposed substantially perpendicular to the plane containing the C and at least one of the cutter blades follows a respective arcuate path towards the other in moving from the open to the excision position. Preferably, both cutter elements follow arcuate paths in moving to the excision position. Ideally, the cutting assembly is configured such that the total angular movement of the cutter element or elements is at least 180°, for example where they move towards one another each moving through at least 90°. One cutter element may have a cutting edge, the other element forming a blunt counter blade or anvil against which the cutting edge bears in the excision position. Preferably, however, both cutting elements are formed with cutting edges, the cutting edges overlapping one another in the excision position to provide a shearing cutting action and the cutter elements having respective radii whereby they nest together in the excision position, the outer edge of the inner blade lying adjacent the inner edge of the outer blade to provide the shearing action as the blades move together to adopt the overlapping configuration. Preferably, the blades in the closed or excision configuration define the curved edge of a semicircle, the ends of the blades being pivotably attached together for movement about an axis which coincides with the diameter. The radius of the outer edge of the inner blade is therefore substantially the same as the radius of the inner edge of the outer blade.

In apparatus according to the invention, the cutter elements may be mounted on a carrier plate which is pivotable between the respective cutting and core discharge positions about a pivot axis either to one side of and preferably parallel with, or above and transverse to, the conveyor means, whereby the excised cores are retained by the cutter elements when in the normal, core-excision, condition and are discharged when the cutter elements have pivoted to an inverted condition, still closed together, when displaced from the pass of the conveyor means. However, the cutter elements may remain in the normal position, the cutter elements opening at the core discharge position to allow the cores to drop away.

The cutter elements may be replaceable to allow for the use of different sizes of cutters, or cutters having different obliquely-angled cutting edges; the latter variable will affect the angle between the cutting edges in the open condition and the depth of the cut in moving from the open to the closed condition, thereby enabling the apparatus to be adapted to different vegetables. The apparatus may include means for adjustment of the registration distance of the cutter elements from the conveyor means in the cutting position.

The cutter elements may be operated by a mechanical linkage such as comprised by a cam element, actuating arms being carried by the cutter elements and being biassed into contact with the cam surface, whereby to closely follow the cam profile on rotation of the cam element, but the cutter elements are preferably power-operated by for example a fluid-operated ram, more preferably a double-acting fluid-operated ram such as a pneumatic cylinder, operatively connected to the cutter elements by a mechanical linkage the gearing of which preferably provides a mechanical advantage and a resulting fast and positive movement of the cutter elements. Pivoting movement of the carrier table may be effected mechanically, for example by a crank wheel rotatably mounted to the chassis of the apparatus and linked to the table by a connecting rod, whereby one complete revolution of the crank wheel results in a complete movement cycle of the table and hence of the cutting assembly from the cutting position to the core discharge position and back to the cutting position. To ensure movement of the cutter elements at the correct timing in synchronism with the cutting head assembly, operation of the cutter elements may be actuated by lobes or other cam means mounted on or carried by the crank wheel. Indexed movement of the conveyor means is also preferably mechanically linked to the crank wheel to ensure that advancing movement of the conveyor means also takes place in synchronism with the cutting head assembly and only while the cutting head assembly is moving between the cutting and core discharge positions.

The mechanical link between the conveyor and the crank wheel may comprise an indexing gearbox the output shaft of which is operatively connected to the conveyor, whereby each complete revolution of the crank wheel results in a predetermined angular rotation of the output shaft, for example through 120°, to advance the conveyor by one indexed stage. For cauliflowers and broccoli, each indexed stage may have a pitch of 300 mm; for smaller vegetables, such as capsicums (sweet peppers), the pitch may be about 100 mm, the pitch being governed by the indexed angular rotation of the output shaft and the gearing ratio between the shaft and the conveyor.

The excised cores may be discharged direct to a collection container or indirectly via a conveyor. Where the cutting head assembly is mounted above and transverse to the conveyor means, the apparatus may include a transverse core discharge conveyor and a core discharge chute connecting the core discharge position with the core discharge conveyor. Preferably, the core discharge conveyor runs laterally with respect to the vegetable support or main conveyor means, whereby the excised cores are ultimately discharged from the apparatus to one side thereof.

Apparatus according to the invention may comprise two or more conveyor means including vegetable supports and a corresponding number of cutting head assemblies, conveniently feeding a common core discharge conveyor. The main conveyor means are preferably arranged in parallel lanes, mutually spaced apart to accommodate the operating mechanism therebetween. In such a multi-lane embodiment, the cutting head assemblies are preferably mounted above and transverse to the conveyor means.

Embodiments of the invention will now be described by way of example with reference to the accompanying drawings, of which:

Figure 1:
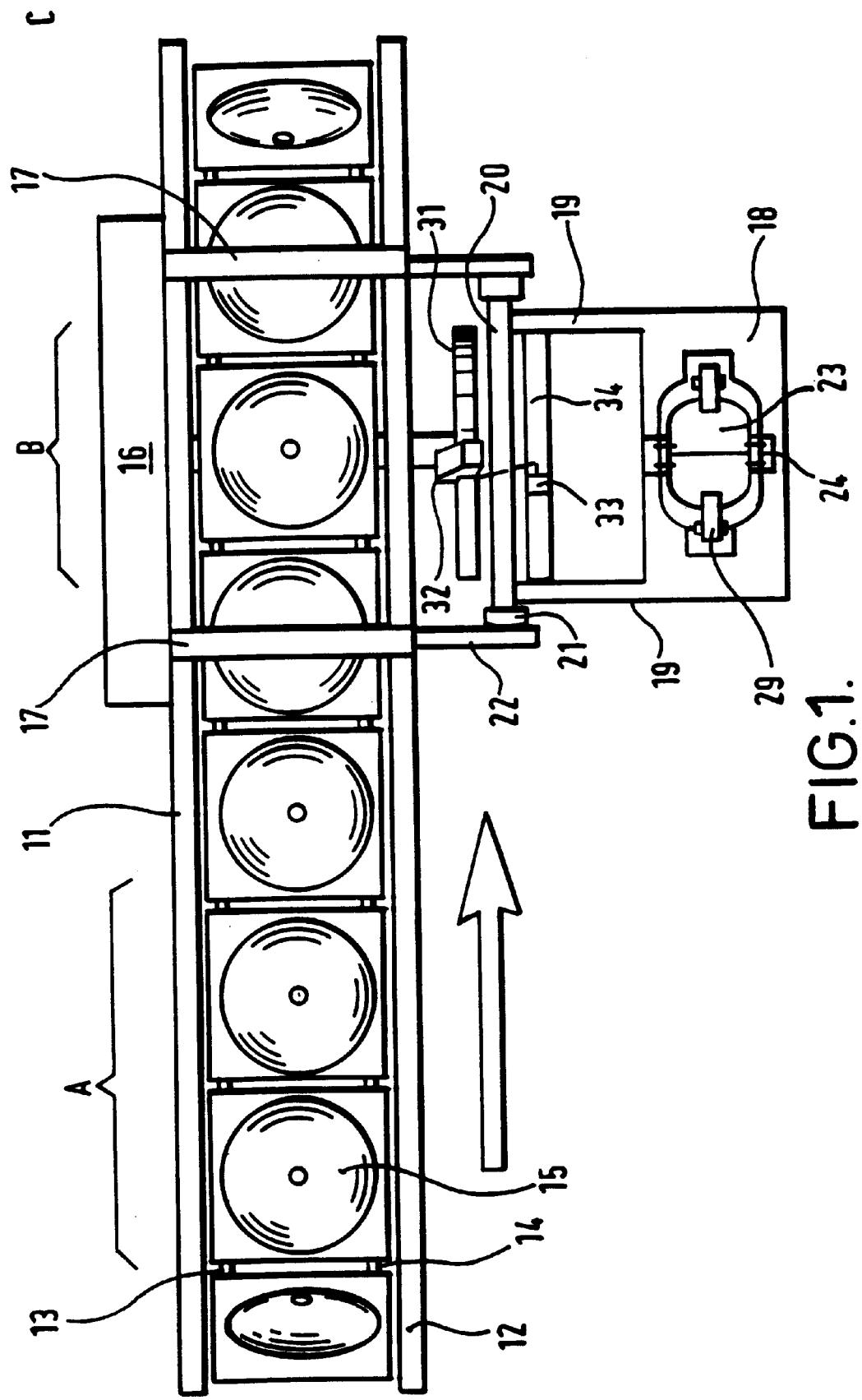
FIG. 1 is a general plan view of a single-lane automated cauliflower coring machine showing the cutting head assembly in the core discharge position.

Referring firstly to FIG. 1, the machine has side chassis members 11, 12 between which is carried a conveyor consisting of chains 13, 14 supporting dishes 15 made of high density polypropylene. The conveyor moves in the direction shown by the arrow from a cauliflower loading station A through a cutting station B to a florets discharge station C.

Figure 2:
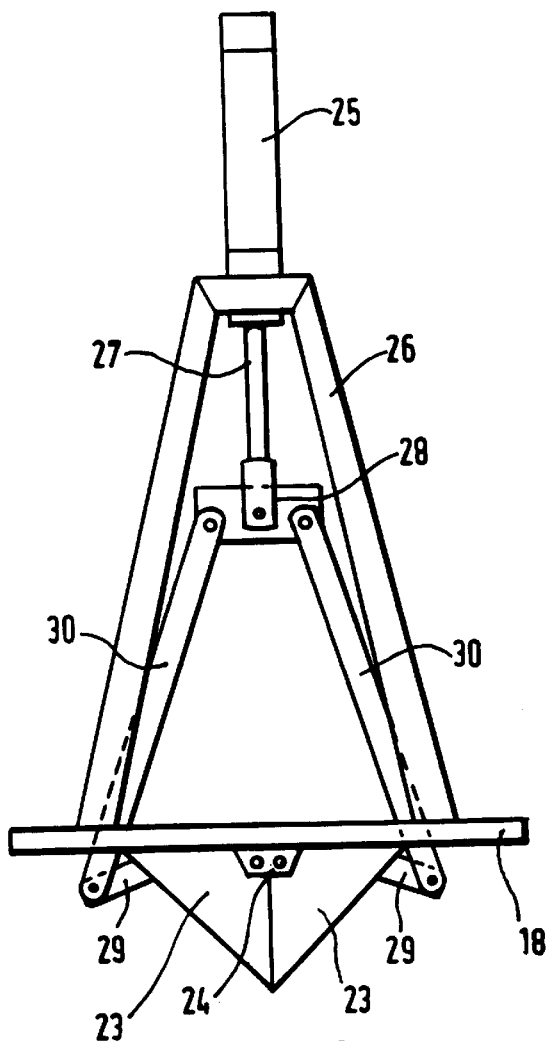
FIG. 2 is a side elevation showing the cutting head assembly of the machine shown in FIG. 1 with the cutters in the closed condition.

At the cutting station B, the housing 16 contains the main drive motor and gear box; overhead lateral members 17 are carried on vertical side members and serve to carry guards (not shown) to prevent operatives from sustaining injury from the cutter head or associated moving machinery. The cutter head assembly consists essentially of a plate 18 attached by arms 19 to a pivot bar 20 carried in bearings 21 secured to upright members 22. With reference to FIG. 2, the cutter blades are constituted by arcuate lobes 23 pivotable attached together by brackets 24 attached to plate 18. The cutter blades are moved towards and away from each other in beak-like fashion by double-acting pneumatic cylinder 25 carried by a channel-section girder framework 26 secured to the plate 18; the piston rod 27 is attached to crosshead 28 which is operatively connected to lugs 29 attached to the cutter blades 23 via connecting rods 30, which can move within the channels of girders 26. In FIGS. 1 and 2, the cutter blades are shown closed together; in FIG. 1, the underside of the plate 18 and cutter blades are shown for clarity as though the plate is horizontal and the cutter blades inverted although in practice the plate would not pivot further than a slightly over-vertical position, to allow the core carried by the cutter blades to be ejected. Pivoting movement of the plate between a position such that the cutter blades are positioned directly over the pass of the conveyor and a position as shown in FIG. 1, laterally displaced from the conveyor pass, is controlled by a crank wheel drivingly connected to the gearbox output shaft. One end of a connecting rod 32 is carried by the crank wheel; the other end is pivotably attached via pivot pin 32a to a lug 33 mounted on cross member 34 carried between the arms 19 of the plate 18. In FIG. 1, the connecting rod 32 is shown detached from the lug but again, in practice, the upper end of the connecting rod is permanently pivotably attached to the lug 33.

Figure 3:
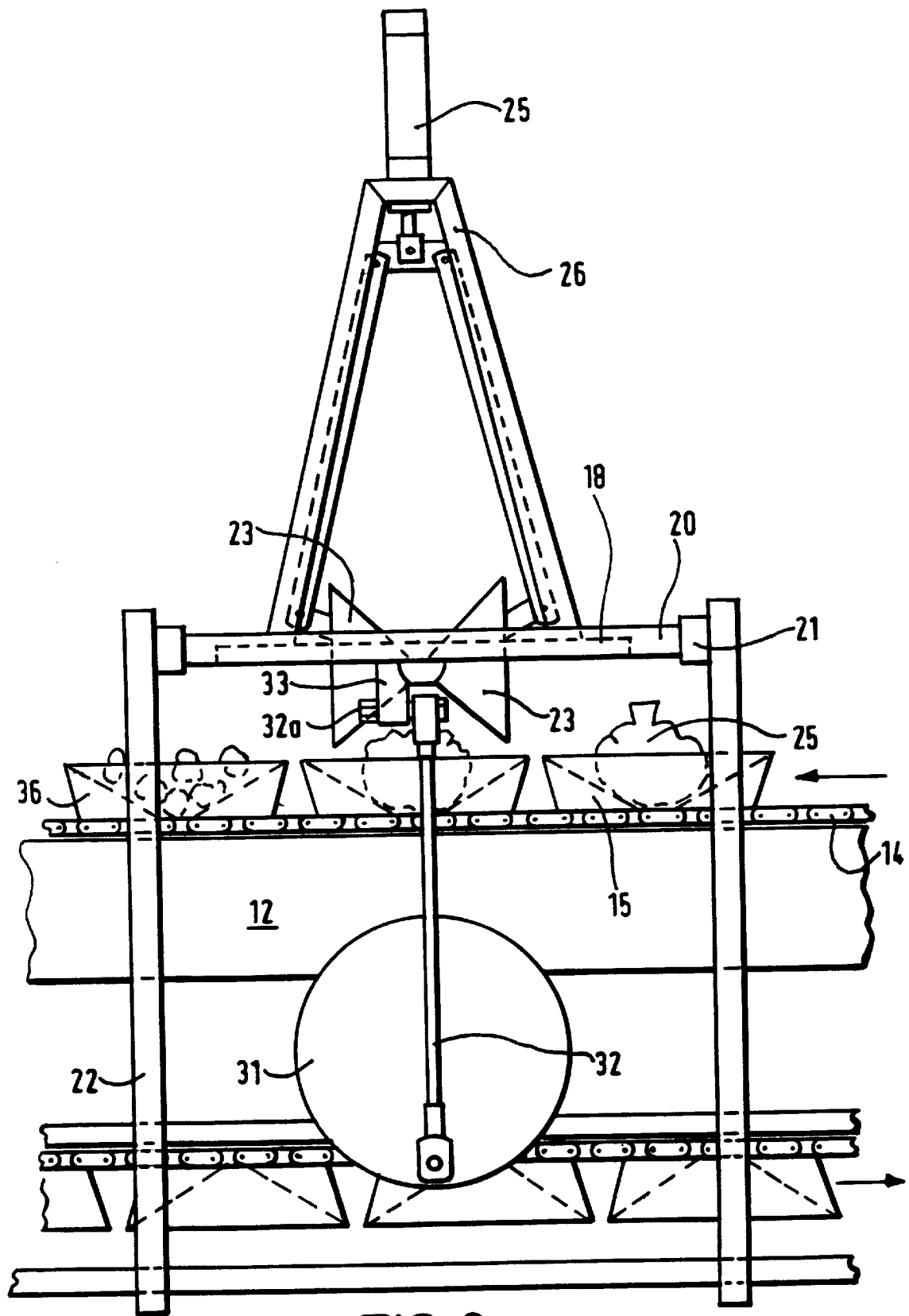
FIG. 3 is a side elevation fragmentary view of the machine of FIG. 1 showing the cutting head assembly in the cutting position with the cutters in the open condition.

With reference to FIG. 3, the operation of the plate 18 is more clearly shown, in that it can be seen how rotation of the crank wheel 31 through 180° will push the lug 33 upwardly, causing the plate 18 to pivot upwardly about pivot bar 20 and the framework 26 to pivot rearwardly (towards the viewer of FIG. 3). The cutter blades in FIG. 3 are shown open with the piston of the cylinder 25 at the top of its travel.

In use, cauliflowers 35 are loaded, core uppermost, in dishes 15 while passing in indexed stages through the loading station A. At the position shown in FIG. 3, the conveyor has stopped and the plate 18 has pivoted downwardly with the cutter blades 23 open, whereby they adopt a position embracing or straddling the cauliflower in the cutting station. The crank wheel turns continuously but, while passing through the bottom dead centre position illustrated, the cylinder 25 is activated (under the influence of a lobe or cam—not shown—on the edge of crank wheel 31 operating a switch to control compressed air to the cylinder 25) to move the cutter blades smartly to the closed position as shown in FIG. 2. Continued rotation of crank wheel 31 lifts the plate 18 with the cutter blades still closed and cradling the excised cauliflower core, as the conveyor is advanced one more indexed stage, at which the dish containing the florets has reached position 36 (FIG. 3). As the crank wheel 31 passes through the top dead centre position (not shown), the plate 18 is over-vertical and the core is ejected under gravity into a suitable container or conveyor; the florets are eventually discharged under gravity into another suitable container or conveyor as the conveyor dishes 15 are inverted at the discharge station end of the conveyor.

The lower pass of the conveyor is shown in FIG. 3 but for the sake of clarity the drawings do not show compressed air lines, switches, mechanical synchronising interlocks and the like. However, the conveyor is operatively connected to the main drive motor via an indexing gearbox the output shaft of which rotates through 120° for each complete revolution of the crank wheel 31.

Figure 4:
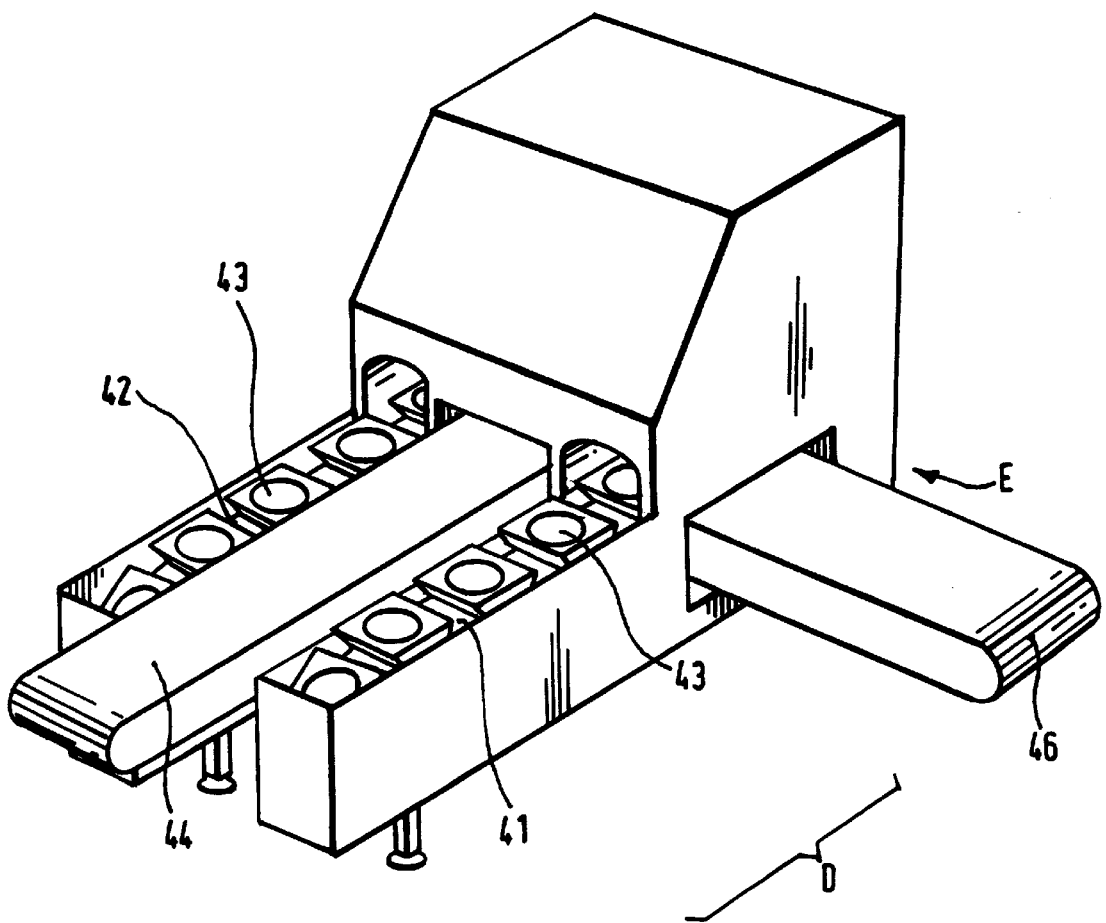
FIG. 4 is a perspective view showing the general arrangement of a two-lane machine.

With reference to FIG. 4, the machine has two parallel conveyor chains 41, 42 each carrying produce support dishes 43. A product infeed conveyor 44 brings vegetables to a loading station D where operatives place the vegetables, core-uppermost, in the support dishes. Operation of the infeed conveyor may be controlled by an electromagnetic, for example infra-red, beam which is arranged to stop the conveyor if a vegetable reaches a predetermined position, to prevent the supply exceeding the capacity of the conveyors 41, 42 to remove vegetables for cutting. A lateral core discharge conveyor 46 discharges excised cores from both main conveyors 41, 42 to one side of the machine. Florets are discharged form the main conveyors 41, 42 at a discharge station E.

It is to be understood that, in the apparatus as described, the pivot bar 20 could be disposed laterally of and above the conveyor or conveyors, the or each cutter head assembly pivoting in a vertical plane which coincides with the axis of the respective conveyor. In such an arrangement, the core discharge position will be above the conveyor and deflector plates or chutes may therefore be provided to carry the ejected cores to one side of the conveyor to the collecting container or the core discharge conveyor.

Figure 6:
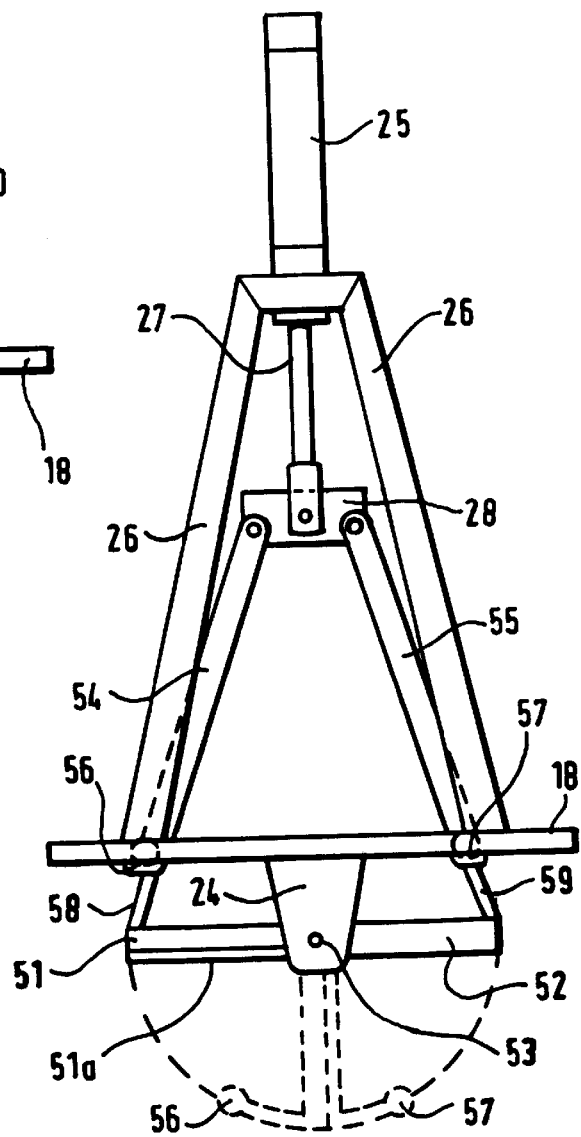
FIG. 6 is a side elevation of a cutting head assembly using C-shaped cutter elements.
Figure 5:
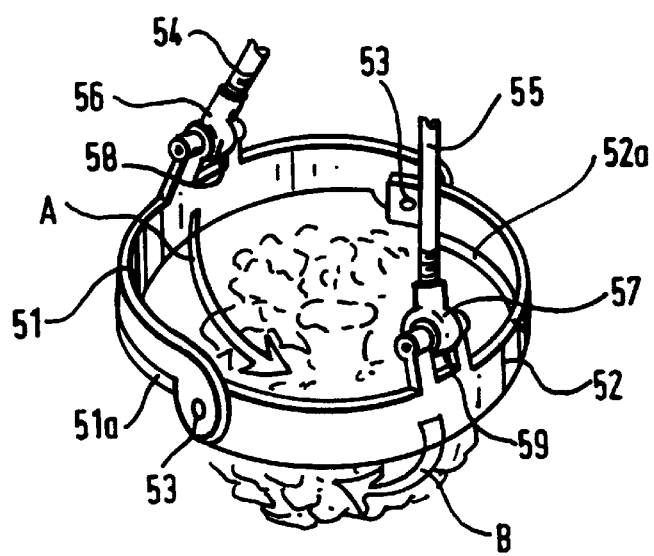
FIG. 5 is a perspective view showing C-shaped cutter elements.

With reference to FIGS. 5 and 6, a cutter assembly consists essentially of generally C-shaped cutter blades 51, 52 hingeably connected together by pins 53. The lower edges 51a, 52a of respective blades 51, 52 are chamfered to form cutting edges. The blades are movable along arcuate paths (shown by arrows A and B) towards the excision position, controlled by link arms 54, 55 connected at their upper ends (see FIG. 6) to the pneumatic ram 25 and at their lower ends to ball joints 56, 57 carried by lugs 58, 59 attached to the blades 51, 52.

In the excision position, the cutting edges 51a and 52a have overlapped in a shearing movement, as more clearly seen in FIG. 6. The ball joints 56, 57 may be "Rosejoint" (RTM) rod end bearings.

In use, a cauliflower is presented with the stalk uppermost (shown in broken outline in FIG. 5) to the notional centre of the cutting assembly. The blades 51, 52 on following their arcuate paths towards one another to the excision position cut the cauliflower as they move together and separate the florets thereof from the stalk. The stalk is retained by the blades, which in combination with the lugs 58, 59 form a supporting cradle for the cores pending ejection. In FIG. 6, the blades are shown in the open condition in solid outline and in the closed-together excision position in dashed outline with the ram fully extended (the ram and the link arms 54, 55 in the extended position not being shown, for the sake of overall clarity).

What is claimed is:

1. Apparatus for the automated removal of cores from vegetables, the apparatus comprising conveyor means (13, 14), said conveyor means including vegetable supports (15) for indexed advancing of vegetables (35), a loading station (A) and a cutting station (B), said conveyor means advancing said vegetables from said loading station (A) to said cutting station (B), and a cutting head assembly comprising one or more cutter elements (23), each said cutter element movable in a core-excision cutting movement, the cutting head assembly being mounted for pivotal movement between a cutting position in registration with a respective one of said vegetable supports when said respective one of said vegetable supports is positioned in the cutting station and a core discharge position displaced from a longitudinal extent of the conveyor means.

2. Apparatus according to claim 1, in which the cutter elements (23) comprise cutter blades which are pivotably mounted for cutting movement in an arcuate path.

3. Apparatus according to claim 1 or claim 2, in which the cutter elements (23) comprise a pair of pivotably-mounted cutter lobes having oblique cutting edges which are movable between a core-embracing condition when open and a core-excision condition when closed together.

4. Apparatus according to claim 1 or claim 2, in which the cutter elements comprise C-shaped cutter blades (51,52) pivotably connected together for movement during said core-excision cutting movement between an open position and a closed-together excision position, at least one cutter blade (51,52) having a cutting edge (51a, 52a) disposed substantially perpendicular to a plane containing the C and at least one of the cutter blades following a respective arcuate path towards the other in moving from the open to the excision position.

5. Apparatus according to claim 4, in which both cutting elements (51, 52) are formed with cutting edges, the cutting edges overlapping one another in the excision position to provide a shearing cutting action.

6. Apparatus according to claim 1 or 2, further comprising a carrier plate (18), the cutter elements being mounted on said carrier plate (18), said carrier plate (18) being pivotable between the cutting position and the core discharge position about a pivot axis to one side of and parallel with the conveyor means.

7. Apparatus according to claim 1 or 2 in which the cutter elements are replaceable.

8. Apparatus according to claim 1 or 2, further comprising a double-acting fluid-operated ram (25), the cutter elements being operably coupled to said ram (25) for operation thereby.

9. Apparatus according to claim 1 or 2 further comprising at least one additional conveyor means (13, 14), said at least one additional conveyor means also including vegetable supports, and a cutting head assembly for each said additional conveyor means.

10. Apparatus according to claim 9, in which said conveyor means and said at least one additional conveyor means are arranged in spaced apart parallel lanes to accommodate respective cutting head assemblies therebetween.

11. Apparatus according to claim 1 or 2, further comprising a carrier plate (18), the cutter elements being mounted on said carrier plate (18), said carrier plate (18) being pivotable between the cutting position and the core discharge position about a pivot axis above and transverse to the conveyor means.

12. A method of removing the cores from vegetables, the method comprising placing vegetables (35) in the inverted state on supports (15) carried by a conveyor means (13, 14), advancing said conveyor means in an indexed manner to bring successive vegetables to a cutting station (B), and excising the cores from said vegetables, the cores being excised by at least one cutter element (23) forming part of a cutting head assembly, the cutting head assembly being mounted for pivotal movement between a cutting position in registration with a vegetable support in the cutting station and a core discharge position displaced from a longitudinal extent of the conveyor means.

* * * * *